United States Patent
Schraut et al.

[19]

[11] Patent Number: 6,165,074
[45] Date of Patent: Dec. 26, 2000

[54] TORSIONAL VIBRATION DAMPER

[75] Inventors: Alfred Schraut, Waigolshausen; Helmuth Weissenberger, Theilheim; Karl Hubert, Schweinfurt; Richard Knoblach, Schwebenried, all of Germany

[73] Assignee: Mannesmann Sachs AG, Schweinfurt, Germany

[21] Appl. No.: 09/178,996

[22] Filed: Oct. 26, 1998

[30] Foreign Application Priority Data

Oct. 25, 1997 [DE] Germany ............................ 197 47 221

[51] Int. Cl.⁷ ...................................................... F16D 3/12
[52] U.S. Cl. ................................................ 464/68; 464/66
[58] Field of Search ....................... 192/213.12, 213.22; 464/63, 64, 66, 68

[56] References Cited

U.S. PATENT DOCUMENTS

| | | | |
|---|---|---|---|
| 3,534,841 | 10/1970 | Schneider | 192/213.12 |
| 4,024,938 | 5/1977 | Maucher | 192/213.12 |
| 4,603,767 | 8/1986 | Blond | 192/213.12 |
| 6,050,382 | 4/2000 | Ester et al. | 192/213.22 |

FOREIGN PATENT DOCUMENTS

| | | |
|---|---|---|
| 43 09 477 | 9/1993 | Germany . |
| 44 30 261 | 11/1996 | Germany . |

*Primary Examiner*—Lynne E. Browne
*Assistant Examiner*—Aaron M Dunwoody
*Attorney, Agent, or Firm*—Cohen, Pontani, Lieberman & Pavane

[57] ABSTRACT

A torsional vibration damper includes a main damper arrangement with side disks which are fixedly connected to one another by welding to a flange ring and connected to an input part of the vibration damper. The side disks are coupled in a torsionally elastic manner with a central disk by first spring elements. The central disk is connected to the output part. A predamper arrangement is arranged axially to the side of the main damper arrangement and includes first and second predamper components which are coupled with one another in a torsionally elastic manner by second spring elements. The output part has a radially projecting projection which runs circumferentially at least partially and is arranged between the second predamper component and the main damper arrangement and fixes the main damper arrangement axially.

6 Claims, 3 Drawing Sheets

TORSIONAL VIBRATION DAMPER

BACKGROUND OF THE INVENTION

1. Field of the Invention

The invention is directed to a torsional vibration damper with a main damper and a predamper, especially for a clutch disk of a motor vehicle friction clutch.

2. Description of the Related Art

A prior art torsional vibration damper of a clutch disk having a main damper arrangement and a predamper arrangement which is arranged axially adjacent to the main damper arrangement is known from DE 44 30 261. The main damper arrangement of the prior art device is dimensioned for load operation and has two disk arrangements which are rotatable relative to one another about the axis of rotation of the clutch disk. A first of the two disk arrangements comprises two side disks with a flange ring arranged between them and separating the two side disks by an axial distance from one another. The side disks are fixedly connected with the flange ring by a plurality of rivets offset in the circumferential direction to form a unit. The flange ring is coupled via a toothing so as to be fixed with respect to rotation, but so as to have rotational play, with a hub that is mountable on an input shaft of a transmission of the motor vehicle. The second of the two disk arrangements includes a central disk arranged axially between the side disks so as to be rotatable relative to the side disks. The central disk includes clutch friction facings and is coupled via first spring elements with the side disks in a frictional-elastic manner.

The predamper arrangement of this prior art device comprises an input component and an output component which are coupled with one another in a torsionally elastic manner via second spring elements which are dimensioned for idling operation. The output component is connected with the hub so as to be fixed with respect to rotation relative to it. The input component has recesses which correspond to the arrangement of the rivet heads in the side disks of the main damper arrangement and to their dimensions and is connected in a rotatably fixed manner with the main damper by mounting on the rivet heads. For the purpose of calibrating the rivet heads, these rivet heads are formed by a one-piece tool which simultaneously comprehends all of these rivet heads, so that the dimensions of the rivet heads and their distance from one another are determined by the tool. Since the tolerances of the tool can be closely dimensioned, tolerances of the rivet heads can be achieved which comparatively closely follow the close tolerances of the cutouts of the predamper input component.

Although a torsional vibration damper of the type known from DE 44 30 261 is inexpensively assembled, the riveting produces a nondetachable connection. Therefore, once it has been assembled, this torsional vibration damper cannot be disassembled again. This can be disadvantageous if it is determined by an operational check after assembly that the spring tolerance or damping tolerance is not maintained and therefore the torsional vibration damper must be disassembled again. Disassembly is only possible by drilling open the rivets, so that this torsional vibration damper must then be discarded as waste.

Reference DE 43 09 477 discloses another prior art torsional vibration damper of a friction clutch which substantially differs from the torsional vibration damper of DE 44 30 261 in that the main damper arrangement is not held together by rivets. The side disks of the main damper arrangement are welded to the flange ring in this case and the main damper arrangement is fixed axially in one direction by the predamper arrangement which is connected with the hub so as to be fixed with respect to rotation relative to it and is fixed axially by caulking. In the other direction, the main damper arrangement is fixed axially by a retaining ring, so that this torsional vibration damper can also be disassembled again. A disadvantage of this prior art device is that the loading capacity with respect to axial forces is limited because this torsional vibration damper is fixed axially in the direction of the predamper arrangement by a weak caulk point. When loaded by strong axial forces, this caulk point would break, so that the predamper arrangement and the main damper arrangement which is axially fixed by the latter would detach from the hub and toothing arranged on the latter, resulting in the loss of operability of the entire clutch.

SUMMARY OF THE INVENTION

It is an object of the present invention to provide a torsional vibration damper with main damper arrangement and predamper arrangement which can be assembled and disassembled again in a simple manner and can absorb comparatively large axial forces.

According to an embodiment of the invention, this object is met by a torsional vibration damper, especially for a clutch disk of a motor vehicle friction clutch, comprising an input part rotatable about an axis of rotation and an output part which is rotatable relative to the input part about the axis of rotation. A main damper arrangement which couples the output part with the input part in a torsionally elastic manner includes two disk arrangements which are rotatable relative to one another about the axis of rotation, wherein a first of the two disk arrangements is connected to one of the input part and the and the output part and a second of the two disk arrangements is connected to the other of the input part and the output part. The first disk arrangement has two side disks which are fixedly connected at a axial distance from one another to form a unit and the second disk arrangement includes a central disk arranged axially between the side disks. A plurality of first spring elements couple the first and second disk arrangements with one another in a torsionally elastic manner. A predamper arrangement is arranged axially adjacent to the main damper arrangement and couples the output part with the first disk arrangement in a torsionally elastic manner. The predamper arrangement has two predamper components which are rotatable relative to one another about the axis of rotation and at least one second spring element coupling the two predamper components in a torsionally elastic manner. The first predamper component is rotatably fixedly connected with the first disk arrangement by an axially insertable positive-engagement coupling means, and the second predamper component is fixed axially at the output part and at least in a first direction so as to be fixed with respect to rotation relative to it. A retaining ring fixes the main damper arrangement axially at the output part in a second direction opposite to the first direction. The output part has a radially projecting projection which runs circumferentially at least in some areas and is arranged between the second predamper component and the main damper arrangement and fixes the main damper arrangement axially in the first direction.

In a torsional vibration damper of the type mentioned above, the radially projecting projection on the output part which extends circumferentially at least in some areas axially fixes the main damper arrangement which can absorb large forces. Accordingly, the main damper arrangement can introduce greater axial forces into the output part and, from the latter, into the input shaft of a transmission of the motor vehicle than was previously possible, which increases the load capacity of the clutch and serves to prolong the life of the clutch in its entirety. Further, the assembly of a torsional vibration damper of this kind is facilitated because the main damper arrangement need only be mounted on the output part and, after assembly, can also be easily disassembled again in connection with the retaining ring which assumes the task of axial fixing in the other direction.

Although the radially projecting projection which extends circumferentially at least in some areas may also be formed, for example, by a retaining ring which is arranged so as to extend completely circumferentially in a correspondingly constructed groove of the output part, the projection is preferably constructed as a flange formed on integral thereto, which allows the output part to be produced as a simple rotating part. If the driving means provided between the main damper arrangement and the output part are then constructed, for example, as a toothing and produced on the output part by the turning process, the flange projects radially from the teeth of the toothing in sections. This enables an effective axial securing along the contour of the output part which can absorb large axial forces. Additional, separately produced means for axially fixing the torsional vibration damper, for example, in the form of retaining rings arranged in a circumferentially extending groove, are not required, so that the additional machining processes needed for this purpose are obviated and manufacture is consequently simpler and more economical.

The projection may be arranged in any desired manner between the second predamper component and the main damper arrangement, but is advisably arranged so that the first predamper component is arranged between the projection and the main damper arrangement and is fixed axially by the projection in the first direction and by the main damper arrangement in the second direction. This predamper arrangement may also introduce larger axial forces in the output part by means of this axial fixing, which increases its load capacity and also, in this case, contributes to an increased life of the predamper arrangement. The assembly of the predamper arrangement on the output part is further improved, especially when the second predamper arrangement advantageously contacts the side of the projection remote of the main damper arrangement and is caulked in this location. The first predamper arrangement is then simply pushed onto the output part and clamped by the main damper arrangement at the projection.

For reasons of stability, the side disks advisably enclose a flange ring between them. This flange ring projects radially from the output part is coupled with the output part by driving means. The driving means can provide for a connection to the output part that is free of play and fixed with respect to relative rotation, but preferably couple the first disk arranged with the output part so as to be fixed with respect to rotation relative thereto but so as to have a predetermined rotational play. The rotational play defines the working area of the predamper arrangement, so that the predamper arrangement is bridged in the working area of the main damper arrangement. Although the side disks of the main damper arrangement which are essentially shaped as annular disks are preferably welded to the flange ring, they may also be fixedly connected with the flange ring in some other way with respect to rotation. However, welding the side disks to the flange ring offers an easy, sturdy and space-saving connection, so that the weight of the torsional vibration damper is further reduced as a whole and its axial overall length is minimized. In an optional embodiment, the central disk, rather than the two essentially annular disk-shaped side disks, is welded or, in some other way, fastened to the flange ring and the two side disks are arranged at the driver disk, so that an inverted arrangement with respect to the side disks and the central disk is provided which can be advantageous in many installation geometries of the torsional vibration damper given by the clutch.

In a preferred embodiment form, it is provided that the first spring elements are arranged in windows of the central disk on the one hand and in windows of the two side disks on the other hand, and that at least one stop which projects through an associated window of the central disk and limits the relative rotational angle of the two disk arrangements is held at the two side disks. This stop can be constructed, for example, as a stop plate whose flat side extends substantially in the circumferential direction and which is used for additional stiffening of the main damper arrangement.

In another preferred construction of the torsional vibration damper, the second predamper component is arranged on the side of the first predamper component remote of the main damper arrangement and has a pocket for each second spring element. The pocket is limited on both sides in the circumferential direction by a stop for the second spring element and guides the second spring element radially. The first predamper component has stop projections which project axially toward the second predamper component and which, in pairs, enclose therebetween each second spring element. The first predamper component also has at least one coupling projection which is directed axially toward the main damper arrangement and engages in a coupling cutout provided in a side disk of the main damper arrangement for rotatably fixing the first predamper component with the main damper arrangement.

In this construction, the pockets of the first predamper component provide for an exact guiding of the second spring element and the second predamper component rotatably couples the second spring element with the main damper arrangement. Both the stop projection and the coupling projection may be constructed as simple, axially bent tabs. However, the stop and coupling projections are advantageously constructed so as to be formed integrally with the predamper component, especially when this predamper component comprises a cast part. When the stop and coupling projections are formed integrally with the predamper component, they are producible with very low tolerances.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
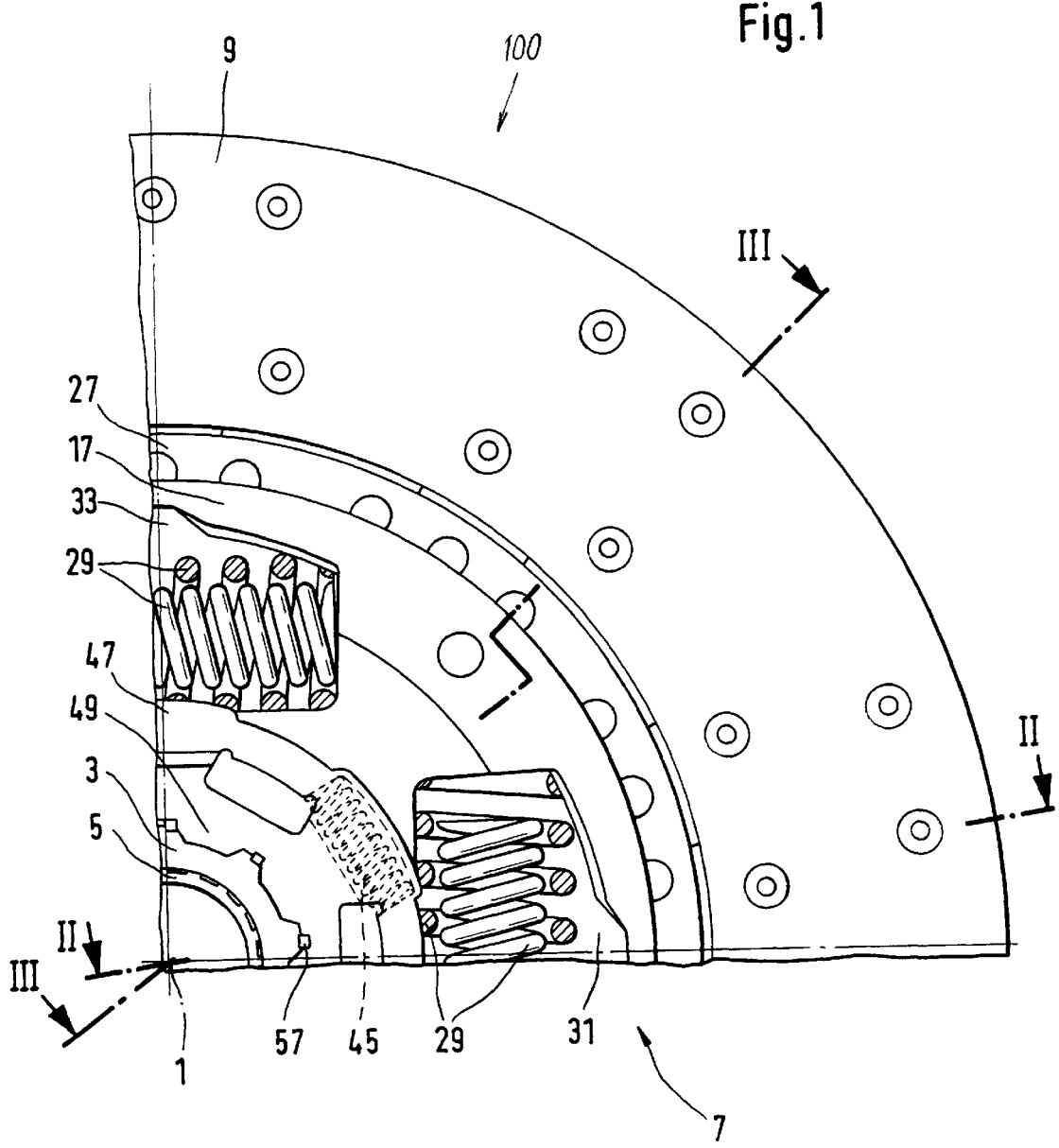
FIG. 1 shows an axial partial view of a clutch disk for a motor vehicle friction clutch with a torsional vibration damper according to the invention.
Figure 2:
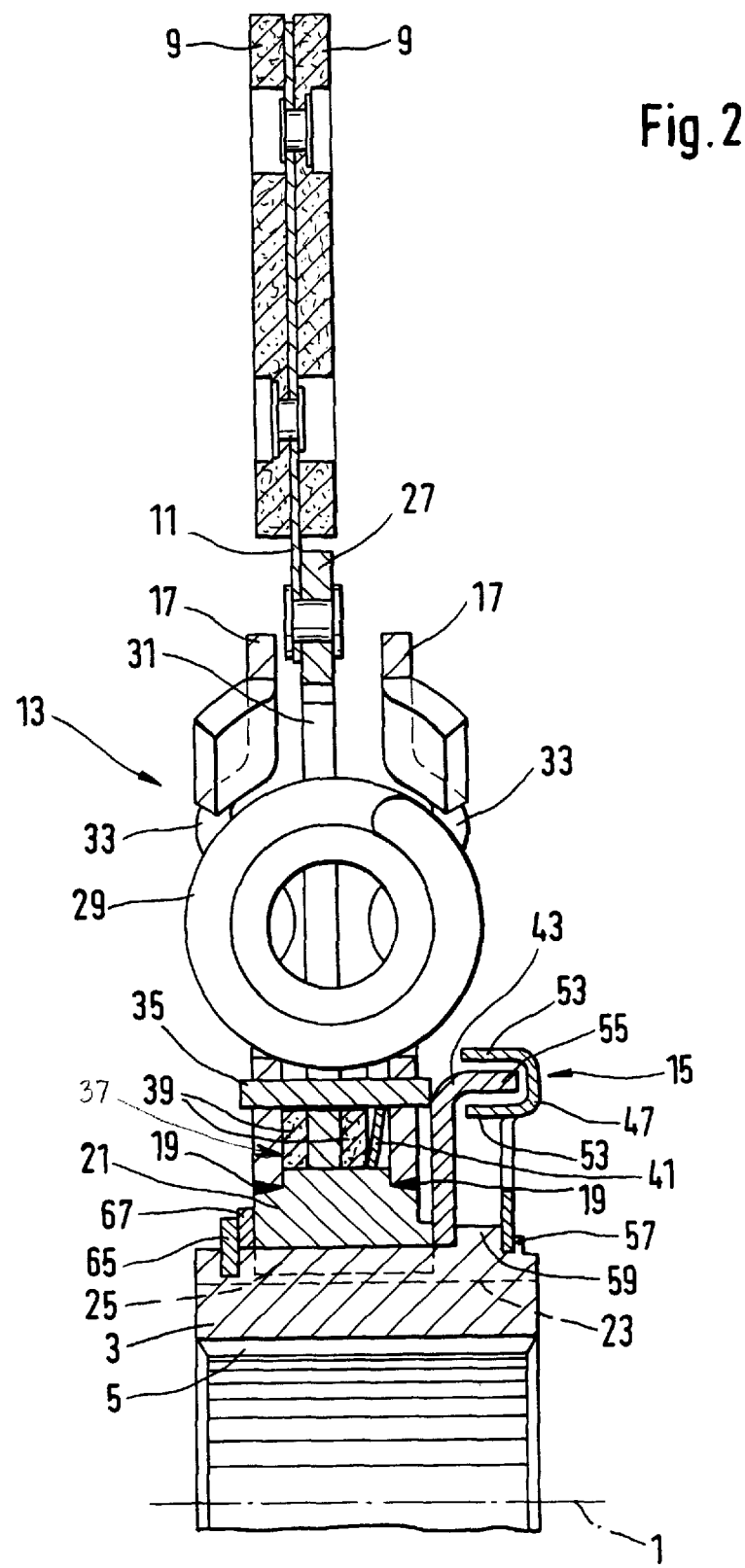
FIG. 2 shows a sectional view of the clutch disk an torsional vibration damper along line II—II of FIG. 1.

Referring to FIG. 1, a clutch disk 100 according to an embodiment of the present invention has a substantially sleeve-shaped hub 3 which is arranged concentric to an axis of rotation 1 and which has at its inner circumference a toothing 5 for connecting with an input shaft, not shown more fully, of a transmission so as to be fixed with respect to rotation relative to it. Referring now also to FIG. 2, a torsional vibration damper 7 connects a driver disk 11 with the hub 3 such that the driver disk 11 is rotatable about the axis of rotation in a torsionally elastic manner with respect to the hub 3. The driver disk 11 has clutch friction facings 9 on both sides. The driver disk 11 with its friction facings 9 forms an input part of the torsional vibration damper 7, while the hub 3 serves as an output part.

The torsional vibration damper 7 comprises a main damper 13 dimensioned for load operation and a predamper 15 which is arranged axially adjacent to the main damper 13 dimensioned for idling operation.

The main damper 13 comprises two side disks 17 which are arranged at an axial distance from one another. The two side disks 17 are essentially shaped as annular disks and fixedly connected at or proximate their inner circumference with a flange ring 21 by a weld 19 to form a unit therewith. The flange ring 21 is arranged axially between the side disks 17 and determines the size of the axial spacing between the side disks 17. An inner toothing 25 is arranged on an inner circumference of the flange ring 21 which engages an outer toothing 23 of the hub 3. The engagement of the toothings 23, 25 comprises a rotational play which determines the working area of the predamper 15 and connect the unit comprising the flange ring 21 and the side disks 17 with the hub 3. Accordingly, the flange ring 21 and the disks 17 are fixed with respect to rotation to the hub 3 after compensation for the rotational play. A central disk 27 is rotatably supported on the flange ring 21 axially between the side disks 17. The driver disk 11 is fastened to the outer circumference of the central disk 27. The driver disk 11 is coupled with the side disks 17 in a torsionally elastic manner via a plurality of helical pressure springs 29 distributed in the circumferential direction. The helical pressure springs 29 are arranged in circumferentially coinciding windows 31 of the central disk 27 and windows 33 of the side disks 17. The ends of the spring 29 are loaded directly by the edge portion of the windows 31, 33 during the relative rotation of the central disk 27.

The relative rotational angle between the central disk 27 and the side disks 17 is defined by plate-shaped stop elements 35 which axially penetrate the windows 31 of the central disk 27 that are provided for receiving the helical pressure springs 29, wherein the stop elements 35 are fastened by their ends in the side disks 17.

The main damper 13 comprises a friction device 37 which acts in load operation during a rotation of the central disk 27 relative to the side disks 17. The friction device 37 has multiple-part friction rings 39 arranged on both axial sides of the central disk 27 between the central disk 27 and the two side disks 17. The friction rings 39 are clamped against the central disk 27 by an axially acting spring 41 such, for example, as a plate spring. The plate spring 41 is arranged between one of the friction rings 39 and the adjacent side disk 17. In the embodiment of FIG. 2, the plate spring 41 is arrange between one of the friction rings 39 and the side disk 17 adjacent to the predamper 15. The plate spring 41 clamps the friction rings 39 against the central disk 27 which is arranged between the friction rings 39 and is guided so as to be rotatable and axially movable on the flange ring 21. The frictional engagement of the plate spring 41 acts along the flange ring 21 toward the opposite side disk 17.

Figure 3:
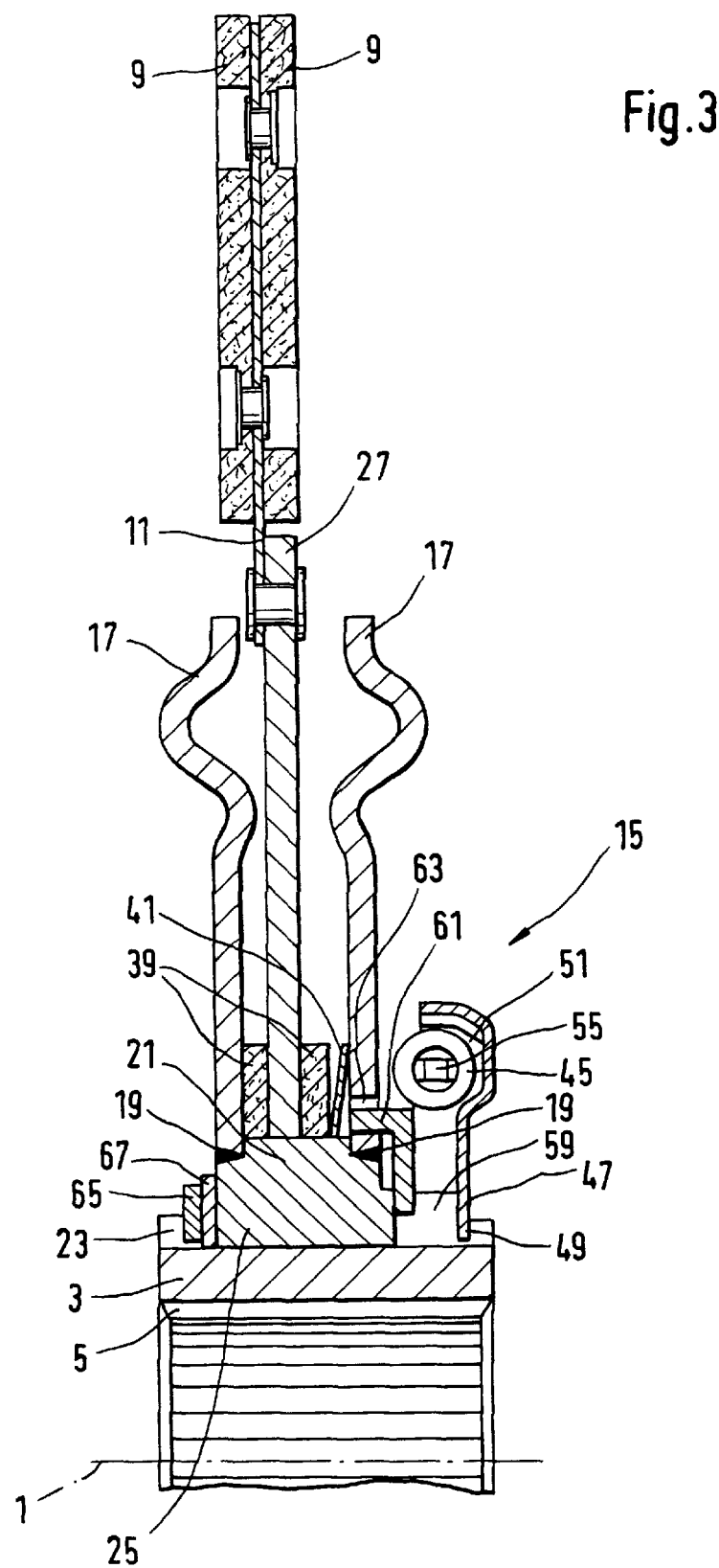
FIG. 3 shows a sectional view of the clutch disk and torsional vibration damper along line III—III of FIG. 1.

Referring also to FIG. 3, the predamper 15 comprises an input component 43 which is rotatably fixedly coupled with the side disks 17 of the main damper 13. The input component 43 is coupled in a torsionally elastic manner, via a plurality of helical pressure springs 45 distributed in the circumferential direction, with an output component 47 which is shaped substantially as an annular disk. The output component 47 is fixed with respect to rotation to the hub 3 via a toothing area 49. The output component 47 has a plurality of pockets 51, each for receiving one of the helical pressure springs 45. The pockets 51 are arranged so as to be distributed in the circumferential direction and are open toward the input component 43. Each of the pockets 51 guides the associated helical pressure spring 45 radially on both sides and has stops 53 in the circumferential direction on both sides of the associated helical pressure spring 45 which cooperate with their front ends. Stop projections 55 which project axially from the input components 43 engage between the stops 53 of the pockets 51 such that a helical pressure spring 45 in a pocket 51 is enclosed between each pair of stop projections 55 which are likewise provided for resting against the front ends of the helical springs 45.

The output component 47 of the predamper 15 is axially fixed by at least one caulk point 57 against one side of a radial projection 59 on the hub 3. The input component 53 is fixed axially at the other side of the projection 59 by the flange ring 21 of the main damper arrangement 13, as will be described more fully hereinafter. The input component 43 of the predamper 15 includes at least one axially projecting coupling projection 61 which is directed toward the main damper arrangement 13 and engages a coupling cutout 63 arranged in the adjacent side disk 17 (FIG. 3). Accordingly, the input component 43 of the predamper 15 is coupled with the main damper arrangement 13 so as to be fixed with respect to rotation relative to it.

In the embodiment example of the torsional vibration damper 7 shown in FIG. 3, the projection 59 arranged on the hub 3 is constructed as a flange which is formed integral to the hub 3. This considerably facilitates the manufacture of the hub 3 because the latter can now be produced as a simple rotating part in which the outer toothing 23 is subsequently formed. The resulting flange 59 which projects sectionwise radially from the hub 3 is arranged on the hub 3 in such a way that the input component 43 of the predamper 15 is arranged between the flange 59 and the flange ring 21 of the main damper arrangement 13 and is axially fixed by the flange 59 in the direction facing the output component 47 of the predamper 15 and is axially fixed by the flange ring 21 in the opposite direction. The axial fixing of the flange ring 21 of the main damper arrangement 13 is carried out in this direction by a retaining ring 65 arranged in a corresponding recess of the hub 3. A stop ring 67 which, among other things, makes it possible to fasten the flange ring 21 to the hub 3 so as to be free of play is arranged between the retaining ring 65 and the flange ring 21.

The above-described arrangement of the projection 59 on the hub 3 offers the advantage that large axial forces exerted on the driver disk 11 via the friction facings 9 during operation are absorbed by the main damper arrangement 13 and introduced directly into the hub 3. Since axial forces imparted to the driver disk are absorbed by the hub 3, the operation of the predamper arrangement 15 is consequently not substantially impaired by these axial forces.

Embodiment forms in which the projection 59 is arranged axially between the input component 43 and the adjacent side disk 17, that is, in which the projection 59 is utilized only for supporting the main damper 13, are not shown. The input component 43 is combined with the output component 47 to form a structural unit which is axially fixed only by caulking 57. Of course, embodiment forms of the predamper 15 which, like the main damper 13, comprise two side disks which are fixedly connected with one another and a central disk which is rotatable relative thereto can also be used in both variants.

The invention is not limited by the embodiments described above which are presented as examples only but can be modified in various ways within the scope of protection defined by the appended patent claims.

We claim:

1. A torsional vibration damper, comprising:

an input part rotatable about an axis of rotation;

an output part rotatable relative to said input part about said axis of rotation;

a main damper arrangement having a first disk arrangement connected to one of said input part and said output part, a second disk arrangement connected to the other of said input part and said output part, and a plurality of first spring elements torsionally elastically coupling said first disk arrangement and said second disk arrangement, said first disk arrangement having two side disks fixedly connected at an axial distance from each other to form a unit and said second disk arrangement having a central disk arranged axially between said two side disks;

a predamper arrangement arranged axially adjacent said main damper arrangement having a first predamper component rotatably fixedly connected to said first disk arrangement, a second predamper component rotatable relative to said first predamper component, and at least one second spring element torsionally elastically coupling said first predamper component and said second predamper component, wherein said second predamper component is axially fixed on said output part with respect to a first axial direction and rotatably fixedly connected on said output part;

said predamper arrangement further comprising an axially insertable positive engagement coupling means connecting said first predamper component to said first disk arrangement and a retaining ring axially fixing said main damper arrangement in a second axial direction opposite said first axial direction on said output part; and said output part further comprising a radial projection between said second predamper component and said main damper arrangement for axially fixing said main damper arrangement in said first direction.

2. The torsional vibration damper of claim 1, wherein said radial projection is comprises an integrally formed flange radially projecting sectionwise from said output part.

3. The torsional vibration damper of claim 1, wherein said first predamper component is arranged between said radial projection and said main damper arrangement and said first predamper component is axially fixed by said radial projection in said first axial direction and by said main damper arrangement in said second direction.

4. The torsional vibration damper of claim 1, wherein said first disks arrangement comprises a flange ring fixedly connected between said side disks; and driving means for coupling said flange ring with said output part such that said flange ring is fixed with respect to rotation relative to said output part with a predetermined rotational play.

5. The torsional vibration damper of claim 1, wherein said central disk comprises windows coinciding with windows in said two side disks;

each said plurality of first spring elements being arranged in said coinciding windows of said central disk and said two disks; and wherein said main damper arrangement comprises at least one stop connected to said two side disks and projecting through each said windows of said central disk for limiting a relative rotational angle of the two disk arrangements.

6. The torsional vibration damper of claim 1, wherein said second predamper component is arranged on a side of said first predamper component remote from said main damper arrangement and comprises a pocket for each said at least one second spring element, said pocket being limited on both circumferential sides by a stop for the second spring element and guiding the second spring element radially;

wherein said first predamper component comprises stop projections projecting axially toward said second predamper component such that adjacent pairs of said stop projections enclose therebetween each said at least one second spring element; and wherein said first predamper component comprises at least one coupling projection projecting axially toward said main damper arrangement such that said at least one coupling projection rotatably fixedly engages a coupling cutout in one of said two side disks.

* * * * *